(12) United States Patent
Narita et al.

(10) Patent No.: US 9,442,601 B2
(45) Date of Patent: Sep. 13, 2016

(54) INFORMATION PROCESSING APPARATUS AND INFORMATION PROCESSING METHOD

(75) Inventors: Tomoya Narita, Kanagawa (JP); Ryoichi Tsuzaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 12/509,783

(22) Filed: Jul. 27, 2009

(65) Prior Publication Data

US 2010/0020037 A1  Jan. 28, 2010

(30) Foreign Application Priority Data

Jul. 25, 2008 (JP) ................................ P2008-192331

(51) Int. Cl.
   *G06F 3/042* (2006.01)
   *G06F 3/044* (2006.01)
   *G06F 3/0488* (2013.01)

(52) U.S. Cl.
   CPC .............. *G06F 3/042* (2013.01); *G06F 3/044* (2013.01); *G06F 3/04883* (2013.01); *G06F 2203/04806* (2013.01)

(58) Field of Classification Search
   CPC ........................... G06F 3/0488; G06F 3/04883
   USPC .......... 345/173, 649; 715/798–801, 863–864
   See application file for complete search history.

(56) References Cited

U.S. PATENT DOCUMENTS

| | | | |
|---|---|---|---|
| 5,168,531 A * | 12/1992 | Sigel .............................. | 382/291 |
| 6,292,173 B1 * | 9/2001 | Rambaldi et al. ............ | 345/157 |
| 6,707,448 B1 * | 3/2004 | Kunimatsu et al. .......... | 345/173 |
| 7,552,402 B2 * | 6/2009 | Bilow ............................ | 715/862 |
| 2004/0125072 A1 * | 7/2004 | Gust .............................. | 345/156 |
| 2006/0026521 A1 | 2/2006 | Hotelling et al. | |
| 2006/0214892 A1 | 9/2006 | Harada et al. | |
| 2006/0232611 A1 * | 10/2006 | Brooke ......................... | 345/671 |
| 2007/0300182 A1 * | 12/2007 | Bilow ........................... | 715/799 |
| 2008/0273755 A1 * | 11/2008 | Hildreth ....................... | 382/103 |
| 2009/0085881 A1 * | 4/2009 | Keam ........................... | 345/173 |
| 2010/0020020 A1 * | 1/2010 | Chen ............................. | 345/173 |
| 2010/0053109 A1 * | 3/2010 | Narita .......................... | 345/173 |

(Continued)

FOREIGN PATENT DOCUMENTS

| | | |
|---|---|---|
| JP | 05-076007 | 3/1993 |
| JP | 09-091079 | 4/1997 |

(Continued)

OTHER PUBLICATIONS

European Search Report dated Sep. 1, 2009, in corresponding European Application No. EP 09 25 1421.

*Primary Examiner* — Lixi C Simpson
(74) *Attorney, Agent, or Firm* — Paratus Law Group, PLLC

(57) ABSTRACT

The present invention provides an information processing apparatus enables the operation such that the relation between the image displayed on the display unit and the operation of the user is close to the actual operation and an information processing method. The information processing apparatus includes a display control unit which displays an image at a display unit, a closeness value acquisition unit which acquires a closeness value regarding contact or closeness between an operation entity and a surface of the display unit, an area detection unit which performs a ternary process to the closeness value and detects a first area and a second area being different from the first area in accordance with the ternary-processed closeness value, and a centroid position calculation unit which calculates respective centroid positions of the first area and the second area.

6 Claims, 10 Drawing Sheets

(56) References Cited

U.S. PATENT DOCUMENTS

2010/0073302 A1* 3/2010 Ritzau et al. ............... 345/173
2010/0289754 A1* 11/2010 Sleeman et al. ............ 345/173

FOREIGN PATENT DOCUMENTS

| | | |
|---|---|---|
| JP | 10-269022 | 10/1998 |
| JP | 11-24839 | 1/1999 |
| JP | 11-024839 | 1/1999 |
| JP | 2006-276223 | 10/2001 |
| JP | 2001-307107 | 11/2001 |
| JP | 2006-276223 | 10/2006 |
| JP | 2008-065730 | 3/2008 |
| JP | 2008-146165 | 6/2008 |
| JP | 2009-064199 | 3/2009 |
| WO | WO 2005/114369 A2 | 12/2005 |

* cited by examiner

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of Related Art

As a display device, there has been a touch panel (a touch screen) which has a touch sensor of an electrostatic method or a resistance membrane method on a surface of a display unit such as a liquid crystal display. With the touch panel, inputting to an information processing apparatus can be performed by touching the screen of the display unit. Therefore, the information processing apparatus can be easily handled by the user.

Further, as a display device which detects operation in the vicinity of a display unit, technologies other than the touch panel have been also disclosed. For example, a technology that a display device simultaneously performs light emission and light reception is disclosed in Japanese Patent Application Laid-Open No. 2006-276223. Further, a technology that a computer device is operated by movement of the user's hand or body is disclosed in Japanese Patent Application Laid-Open No. 11-24839 (Japanese Patent No. 3968477). Furthermore, a technology of a panel which can output information of a plurality of input points on the panel is disclosed in Japanese Patent Application Laid-Open No. 2008-146165.

SUMMARY OF THE INVENTION

By the way, a user interface such as a touch sensor which is arranged on a touch panel in related art only detects whether or not there is contact with the user's finger or a stylus etc. In this case, interactions which can be executed by the operation method of the user are limited to button pushing and releasing (button-up and button-down), clicking, double-clicking, contacting, drag and drop, and quick scroll (flick), for example.

Further, there has been a touch panel which can detect contact of a plurality points. In this case, interactions achieved depending on user's operation method are limited to zooming (pinch-open, pinch-close), two finger scroll and two finger rotation.

Similar to the operation of a mouse or a touch pad, an object which is displayed on a screen is operated by the user as if the object is sliding freely in the screen.

The present invention has been made in view of above issue, and it is desirable to provide a novel and improved information processing apparatus enables the operation such that the relation between the image displayed on the display unit and the operation of the user is close to the actual operation and an information processing method.

According to an embodiment of the present invention, there is provided an information processing apparatus including: a display control unit which displays an image at a display unit; a closeness value acquisition unit which acquires a closeness value regarding contact or closeness between an operation entity and a surface of the display unit; an area detection unit which performs a ternary process to the closeness value and detects a first area and a second area being different from the first area in accordance with the ternary-processed closeness value; and a centroid position calculation unit which calculates respective centroid positions of the first area and the second area.

The closeness value acquisition unit may include a light reception unit which receives light incident from outside to a display surface of the display unit and converts the received light into an electric signal, and a brightness value calculation unit which calculates a brightness value for each pixel from the electric signal as the closeness value.

The closeness value acquisition unit may include an electrostatic capacity detection unit which detects electrostatic capacity between the operation entity and the surface of the display unit, and a closeness value calculation unit which calculates variation of the electrostatic capacity as the closeness value.

The information processing apparatus may include a line direction calculation unit which calculates a direction of a line connecting a first centroid which is a centroid of the first area and a second centroid which is a centroid of the second area. Here, both the centroids are calculated by the centroid position calculation unit.

The information processing apparatus may include a movement detection unit which detects movement of a first centroid which is a centroid of the first area and a second centroid which is a centroid of the second area. Here, both the centroids are calculated by the centroid position calculation unit.

The information processing apparatus may include a determination unit which determines that the first area is to be the area where the operation entity in the vicinity of the display unit is closest to the display surface of the display unit and the second area is to be the area where the operation entity is apart from the display surface of the display unit more than the first area.

The display control unit may display the image to be displayed at the display unit based on the direction of the line which is calculated by the line direction calculation unit.

The display control unit may display the image to be displayed at the display unit based on the movement of the first centroid and the second centroid detected by the movement detection unit.

The display control unit may display the image to be displayed at the display unit based on the area which is determined by the determination unit.

Furthermore, according to another embodiment of the present invention, there is provided an information processing method including the steps of: displaying an image at a display unit with a display control unit; acquiring a closeness value regarding contact or closeness between an operation entity and a surface of the display unit with a closeness value acquisition unit; performing a ternary process to the closeness value and detecting a first area and a second area being different from the first area in accordance with the ternary-processed closeness value with an area detection unit; and calculating respective centroid positions of the first area and the second area with a centroid position calculation unit.

According to the embodiments of the present invention, the relation between the image displayed on the display unit and the operation of the user can be close to the actual operation

DETAILED DESCRIPTION OF PREFERRED EMBODIMENTS

Figure 1:
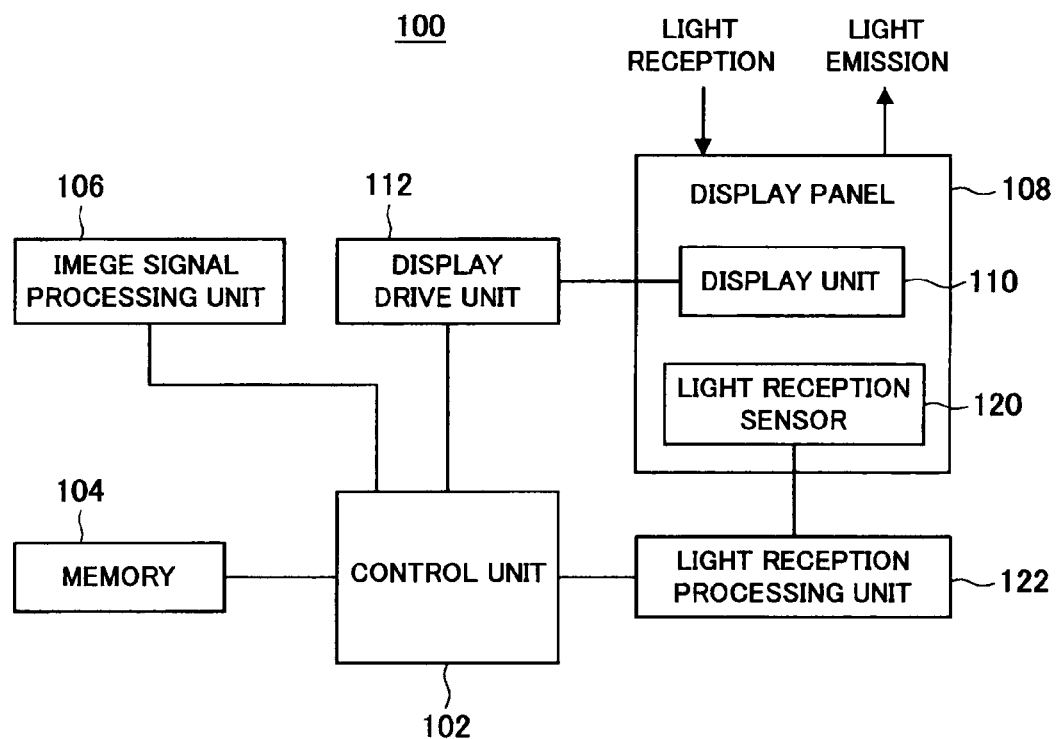
FIG. 1 is a block diagram which illustrates an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, an information processing apparatus 100 according to an embodiment of the present invention is described. FIG. 1 is a block diagram which illustrates the information processing apparatus 100 according to the embodiment.

For example, the information processing apparatus 100 of the present embodiment includes a control unit 102, a memory 104, an image signal processing unit 106, a display panel 108, a display drive unit 112, a light reception processing unit 122 and the like. Here, in description of the present embodiment, the display panel 108 is integrally arranged to the information processing apparatus 100. However, the present invention can be applied to a case that the information processing apparatus 100 and the display panel 108 are separately arranged.

The information processing apparatus 100 is a personal computer, an audio player, a media player, a PDA (Personal Digital Assistant), a cellular phone or the like, for example.

For example, the control unit 102 includes a microcomputer which is configured by combining a CPU (Central Processing Unit), a ROM (Read Only Memory), a RAM (Random Access Memory) etc. The control unit 102 functions as an arithmetic processing device and a control device with a program and controls each of the above constitutional elements of the information processing apparatus 100.

Further, the control unit includes a brightness value calculation unit, an area detection unit, a centroid position calculation unit, a line direction calculation unit, a movement detection unit, a determination unit and the like.

The brightness value calculation unit calculates a brightness value for each pixel with the image signal which is received from the light reception processing unit 122. The area detection unit performs a ternary process to the brightness value and detects a first area and a second area which differs from the first area of a detected object in accordance with the ternary-processed brightness value. The centroid position calculation unit calculates respective centroids of the first area and the second area.

The line direction calculation unit calculates the direction of a line connecting a first centroid which is the centroid of the first area and a second centroid which is the centroid of the second area. Here, both are calculated by the centroid position calculation unit. The movement detection unit detects movement of the first centroid which is the centroid of the first area and the second centroid which is the centroid of the second area. Here, both are calculated by the centroid position calculation unit. The determination unit determines that the first area is to be the area where an operation entity in the vicinity of the display unit is closest to the display surface of the display unit and the second area is to be the area where the operation entity is apart from the display surface of the display unit more than the first area.

The memory 104 is configured with a storage unit such as a RAM, a ROM and a cache memory, for example. The memory 104 has a function to temporarily store data regarding processes of the CPU of the control unit 102, operation programs of the CPU and the like.

The image signal processing unit 106 performs image signal processes to an image signal which is generated at the light reception processing unit 122. The image signal processing unit 106 performs necessary signal processes to the image signal, such as resolution conversion to convert into the pixel amount of a display unit 110, brightness correction, color correction, gamma correction and the like.

The display panel 108 includes a display unit 110 and a light reception sensor 120, for example. The light reception sensor 120 receives operation of the user by detecting the operation entity such as a finger or a hand of the user. Being different from a touch panel, the display panel 108 of the present embodiment receives the user's operation by detecting closeness to the screen without contact on the screen. Then, the display panel 108 performs selecting of items displayed on the screen, scrolling of the screen and zooming in accordance with the operation of the user.

The display unit 110 is a liquid crystal display, for example, and is controlled by the display drive unit 112. The display unit 110 displays a variety of menu frames and images of image data. The light reception sensor 120 is an example of the light reception unit. The light reception sensor 120 receives the light incident from outside to the display surface of the display unit 110 and converts the received light into an electric signal. The light reception sensor 120 transmits the generated electric signal to the light reception processing unit 122. Here, the combination of the light reception sensor 110 and the brightness value calculation unit of the control unit 102 is an example of a closeness value acquisition unit. The closeness value acquisition unit acquires the closeness value (the brightness value in the present embodiment) regarding the contact or the closeness between the operation entity and the surface of the display unit.

Figure 2:
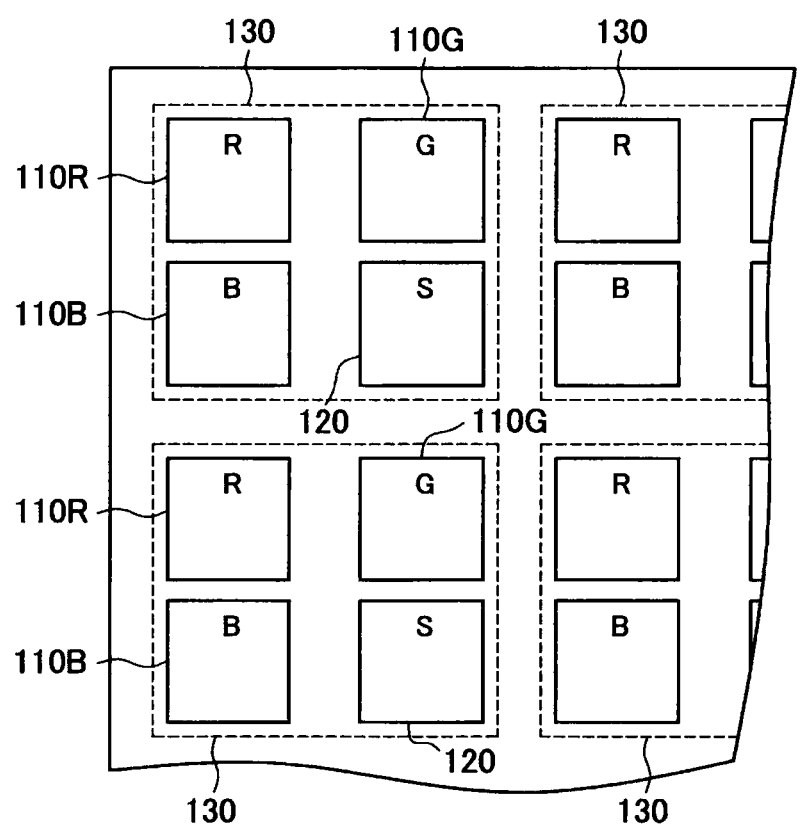
FIG. 2 is an explanatory view of a pixel part of a display panel according to the present embodiment.

FIG. 2 is an explanatory view of a pixel part of the display panel 108 according to the present embodiment. A plurality of pixel sets 130 are arranged at the display panel 108 in a matrix form, for example. Then, the pixel set 130 includes the light reception sensor 120 and luminous elements of a red display element 110R, a green display element 110G and a blue display element 110B. The light reception sensor 120 and the display elements 110R, 110G, 110B are adjacently arranged in each of the pixel sets 130. Here, not limited to the example illustrated in FIG. 2, the pixels may be arranged in different forms.

When the operation entity such as a finger and a hand of the user approaches to the display surface, the information processing apparatus 100 can detect the operation entity with the display panel 108 of the present embodiment.

The display drive unit 112 which is an example of a display control unit and drives the display unit 110 by utilizing the input image signal. The display drive unit 112 performs a display process of the image signal which is received from the image signal processing unit 106. Further, the display drive unit 112 performs a combining process of the display data and generates the data which can be viewed and listened by the user with the display unit 110. The data generated at the display drive unit 112 is output to the display unit 110.

The light reception processing unit 122 performs an analog-digital conversion process etc. after receiving the electric signal from the light reception sensor 120 and generates an image signal for each of the pixels. Accordingly, the image signal can be processed at the image signal processing unit 106 and various kinds of arithmetic based on the image signal can be performed at the control unit 102.

Figure 3:
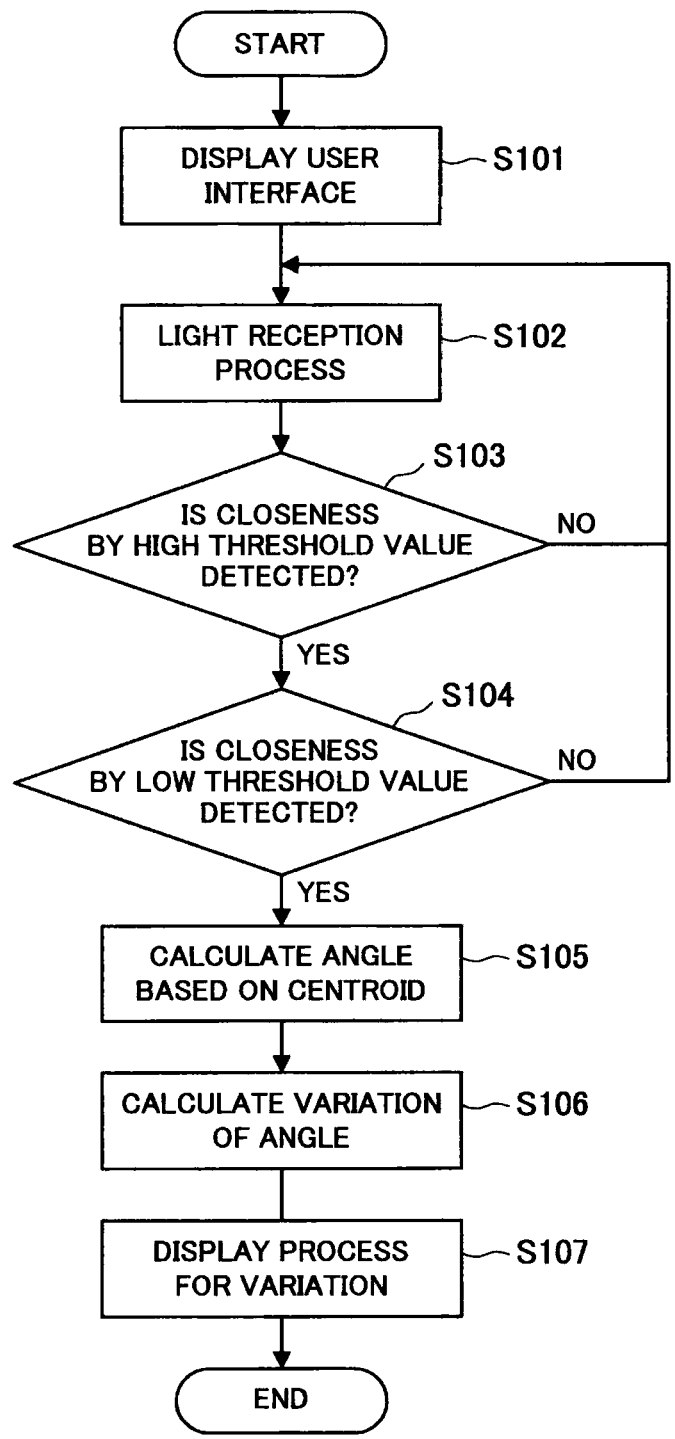
FIG. 3 is a flowchart which describes operation of the information processing apparatus according to the present embodiment.
Figure 4A:
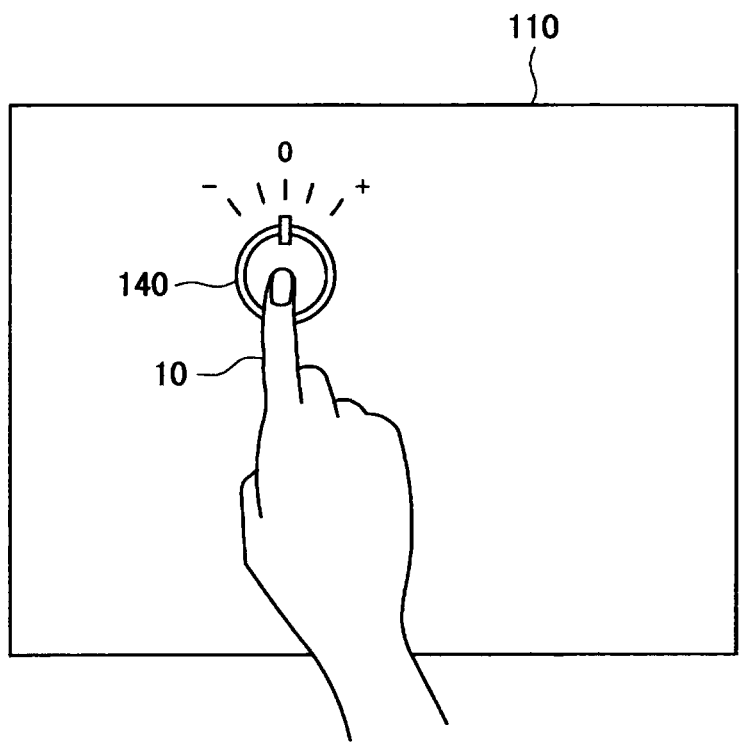
FIG. 4A is an explanatory view which illustrates an image displayed at a display unit and operation of the user.
Figure 4B:
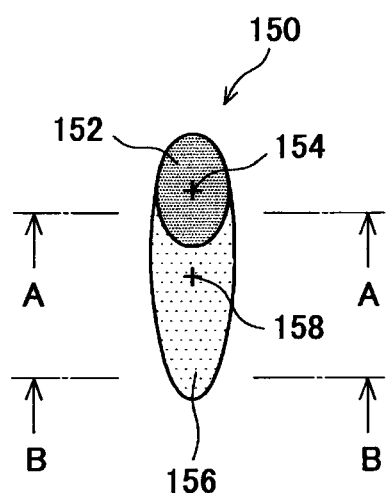
FIG. 4B is an explanatory view of areas of brightness values which are acquired through a ternary process after being detected by a light reception sensor.
Figure 5A:
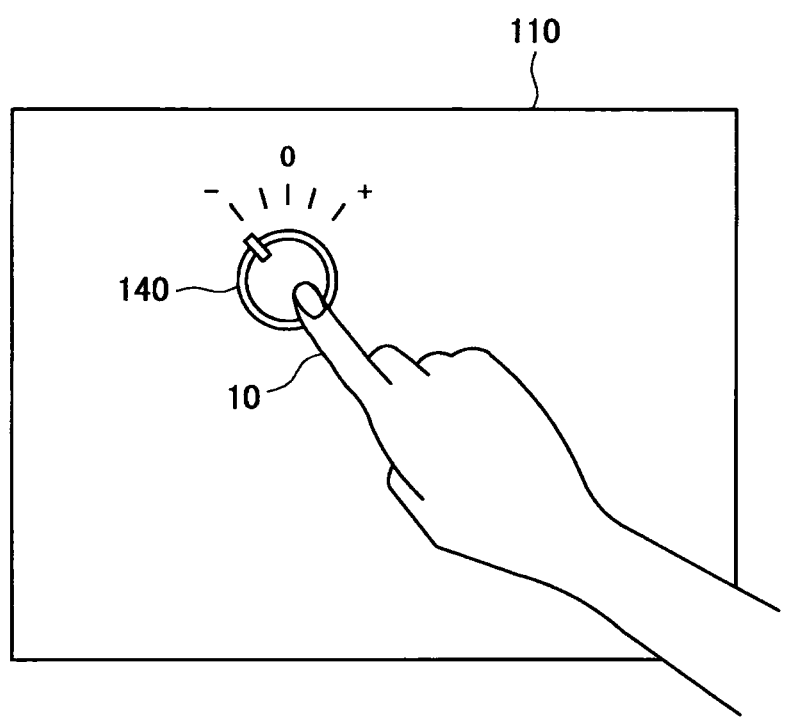
FIG. 5A is an explanatory view which illustrates an image displayed at the display unit and operation of the user.
Figure 5B:
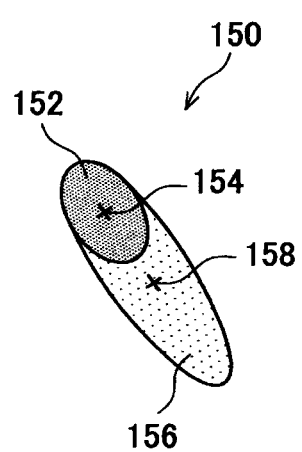
FIG. 5B is an explanatory view of areas of brightness values which are acquired through the ternary process after being detected by the light reception sensor.
Figure 6A:
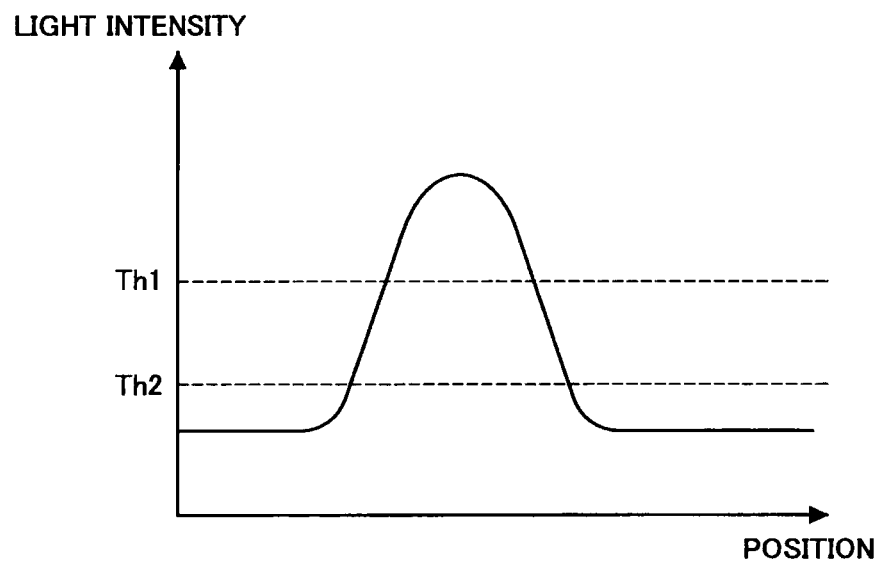
FIG. 6 is a graph which illustrates distribution of the brightness value (light intensity)
Figure 6B:
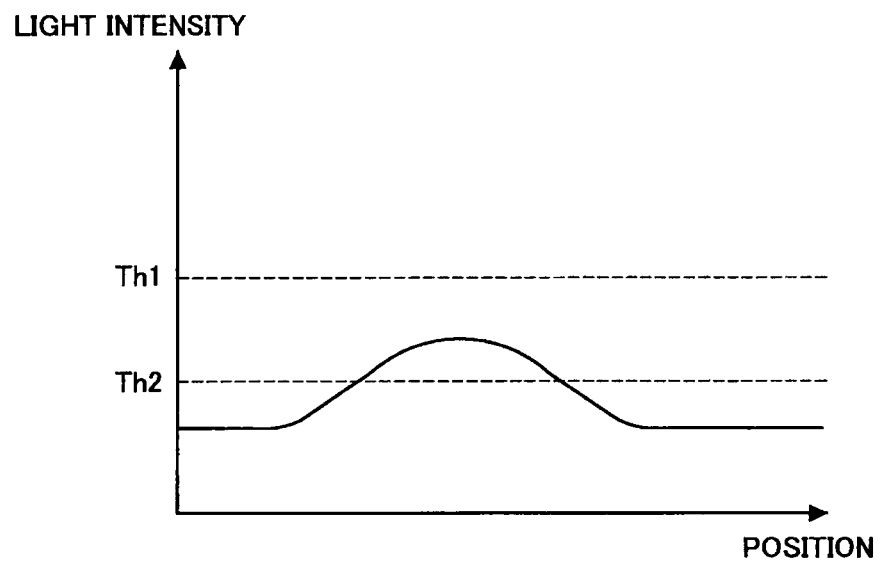

Next, the operation of the information processing apparatus 100 according to the present embodiment is described with reference to FIGS. 3 through 6. FIG. 3 is a flowchart which describes the operation of the information processing apparatus 100 according to the present embodiment. FIG. 4A and FIG. 5A are explanatory views which illustrate the image displayed at the display unit 110 and the operation of the user. FIG. 4B and FIG. 5B are explanatory views of areas of the brightness values which are acquired through the ternary process after being detected by the light reception sensor 120. FIG. 6A and FIG. 6B are graphs which illustrate distribution of the brightness value (light intensity). FIG. 6A illustrates the brightness value distribution on line A-A in FIG. 4B and FIG. 6B illustrates the brightness value distribution on line B-B in FIG. 4B.

First, the information processing apparatus 100 displays the images, the menu frames or the like based on the image data at the display panel 108 as a user interface (step S101). In FIG. 4A, a dial 140 is displayed at the display unit 110 as an example.

As illustrated in FIG. 4A, when a finger 10, a hand, a stylus or the like is approached to the screen of the display unit 110 by the user, the light reception processing unit 122 performs a light reception process (step S102) based on the light detected by the light reception sensor 120. In a case that an operational object (for example, the dial 140, a later-mentioned button 170 in FIG. 7 and the like) on the screen is to be pointed by the user, one end side of the finger 10, the hand or the stylus is approached to the screen and the other end side thereof is apart from the screen more than the one end side. In the following description, the top end of the finger 10 (the fingertip) is to be closest to the screen and the palm side of the finger 10 is to be apart from the screen more than the fingertip.

Next, the control unit 102 calculates the brightness value for each of the pixels of the image signal which is generated at the light reception processing unit 122 and performs the ternary process to the brightness value. The ternary process has two predetermined threshold values and categorizes the brightness values which are variously distributed as illustrated in FIG. 6 into three values in accordance with the threshold values. Here, the threshold values can be set in accordance with various conditions.

In the state that the screen is pointed by the finger 10 of the user, the brightness value may be distributed as illustrated in FIG. 4B. An area 152 is the area of which brightness value is high. An area 156 is the area of which brightness value is intermediate. The area other than the area 152 and the area 156 is the area where the brightness value is low. The area 152 is the area where the operation entity such as the top end of the finger 10 is closest to the screen. The area 156 is the area which corresponds to a part of the finger 10 which is apart from the screen more than the top end of the finger 10.

When the brightness value which exceeds the high threshold value is detected (step S103), the information processing apparatus 100 can determine that there is closeness to the screen by the user's operation. Subsequently, the information processing apparatus 100 detects closeness by the low threshold value (step S104). When the closeness by the low threshold value is detected, the information processing apparatus 100 can determine that the screen is pointed by the finger 10 etc. of the user from a predetermined direction.

Then, the centroid position calculation unit calculates respective centroid positions of the area 152 and the area 156. In FIG. 4B, the centroid position 154 is the centroid position of the area 152 and the centroid position 158 is the centroid position of the area 156. The line direction calculation unit calculates the direction of the line connecting the centroid position 154 and the centroid position 158 based on the centroid positions 154, 158 (step S105). For example, the line direction calculation unit calculates an angle of the line against coordinates which are virtually arranged in the screen. In the example of FIG. 4, the angle of the line direction is approximately parallel to the vertical direction of the screen of the display unit 110.

Next, when the finger 10 etc. of the user turns, distribution positions of the area 152 and the area 156 are changed as illustrated in FIG. 5 from those in FIG. 4, for example. In this case as well, the centroid position calculation unit calculates the respective centroids of the area 152 and the area 156. Then, the line direction calculation unit calculates the direction of the line connecting the centroid position 154 and the centroid position 158. In the example of FIG. 5, the angle of the line direction is inclined to the vertical direction (or the horizontal direction) of the screen of the display unit 110.

Further, the movement detection unit detects the movement of the centroid position 154 and the centroid position 158 (step S106). For example, variation of the direction of the line connecting the centroid position 154 and the centroid position 158 is calculated. As a result, the display drive unit 112 of the information processing apparatus 100 can change the dial 140 which is displayed at the screen in accordance with the operation of the user. As illustrated in FIG. 5A, the display drive unit 112 performs a display process to change the direction of the dial 140 (step S107).

In this manner, the dial arranged on the screen can be rotated by twisting with the finger 10 in the example of the FIG. 4 and FIG. 5.

As mentioned above, the display panel 108 which has the light reception sensors 120 arranged for each of the pixels and which is capable of detecting the closeness of the finger 10 etc. to the screen without contact. With the display panel 108, the operation of the finger 10 against the screen can be detected as a two dimensional bitmapped image. Subsequently, the image process of noise reduction etc. is performed against the acquired image. Then, clustering (area categorizing) is performed through the ternary process with the two-stepped predetermined threshold values. By calculating centroid position of each of the areas, the area where the operation entity is closest to the screen is determined by the high threshold value and the area where the operation entity is slightly apart from the screen is determined by the low threshold value. Then, by chasing variation of the centroid position with time, the rotation of the finger 10 can be detected.

Next, the operation of the user against the image which is displayed at the display unit of the present embodiment is described. FIGS. 7 through 10 are explanatory views which illustrate the image displayed at the display unit 110 and the operation of the user.

Figure 7A:
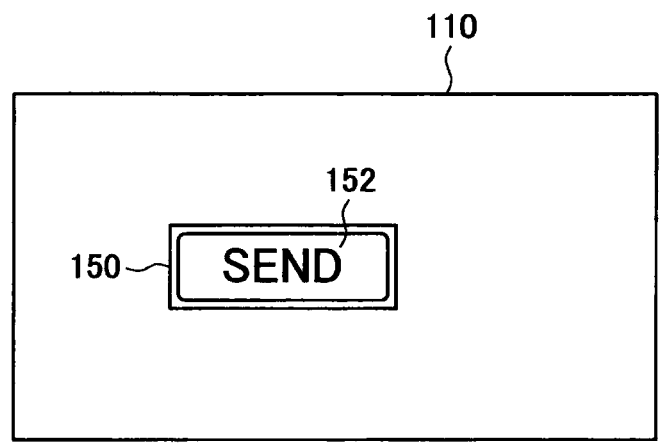
FIG. 7 is an explanatory view which illustrates an image displayed at the display unit and operation of the user.
Figure 7B:
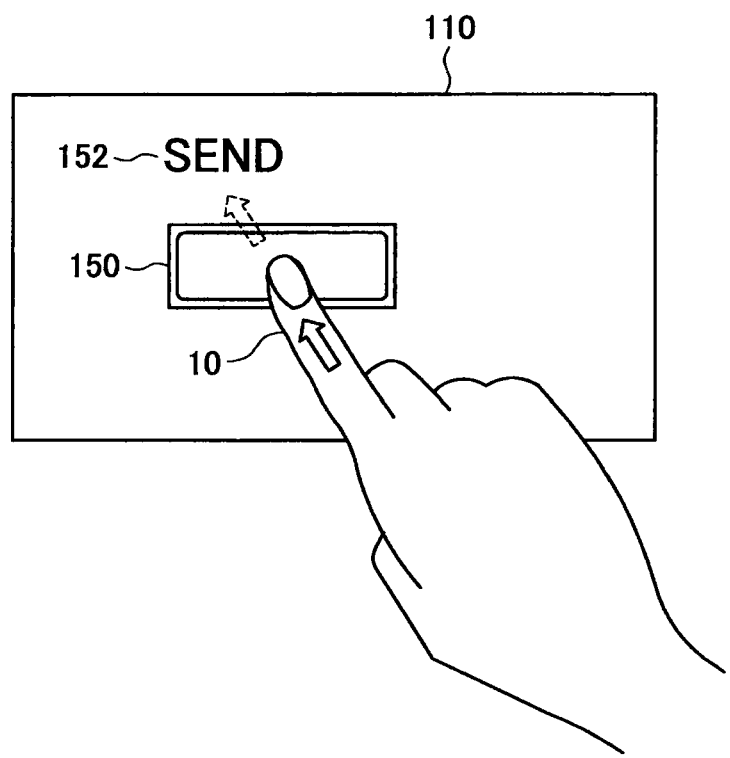

FIG. 7 illustrates an example in which a button 150 is displayed at the display unit 110. Normally, characters 152 which indicate the function of the button 150 are arranged as illustrated in FIG. 7A. Then, when the user is about to push the button 150 which is displayed at the screen, the information processing apparatus 100 of the present embodiment detects the first area and the second area of the finger 10 and calculates the respective centroid positions. Therefore, the pointing direction of the finger 10 can be determined. Accordingly, the information processing apparatus 100 can suppose the position of the finger 10 with the calculation result and move the characters 152 not to be hidden by the finger 10 for the user.

In this manner, in the present embodiment, the issue that the user hides the characters of the button 150 with his/her finger 10 when touching the display unit 110 does not arise. Therefore, displaying which is easy-to-use for users can be actualized.

Figure 8A:
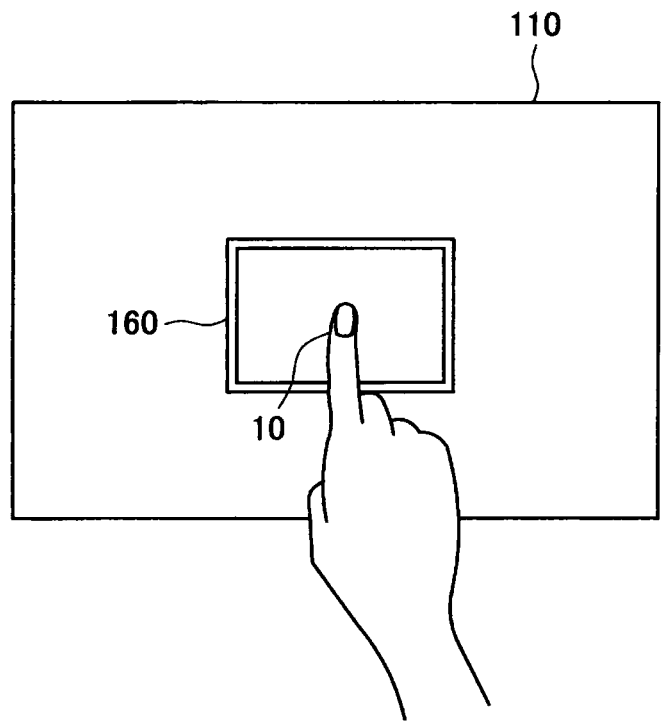
FIG. 8 is an explanatory view which illustrates an image displayed at the display unit and operation of the user.
Figure 8B:
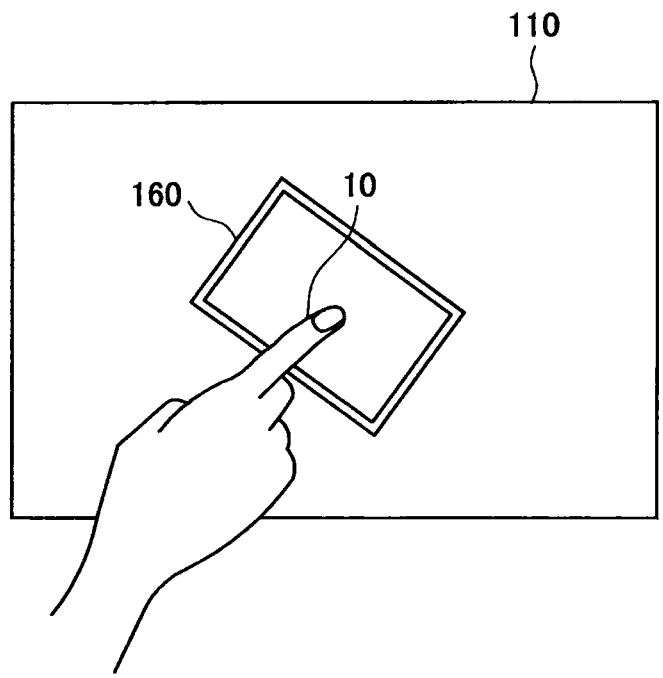

FIG. 8 illustrates an example in which an object 160 of a picture etc. is displayed at the display unit 110. Similar to the dial 140 which is described with reference to FIG. 4 and FIG. 5, the rotation of the finger 10 can be detected so that the object 160 can be rotated with the operation of the finger 10 in the present embodiment. Similar to the movement of an object 180 such as drag-and-drop in related art, the user can intuitively perform the movement such as the rotation of the object 180 without preliminary study. Therefore, the operation such as changing the position of the object 180 or rotating the object 180 can be performed extremely easily by the user.

Figure 9A:
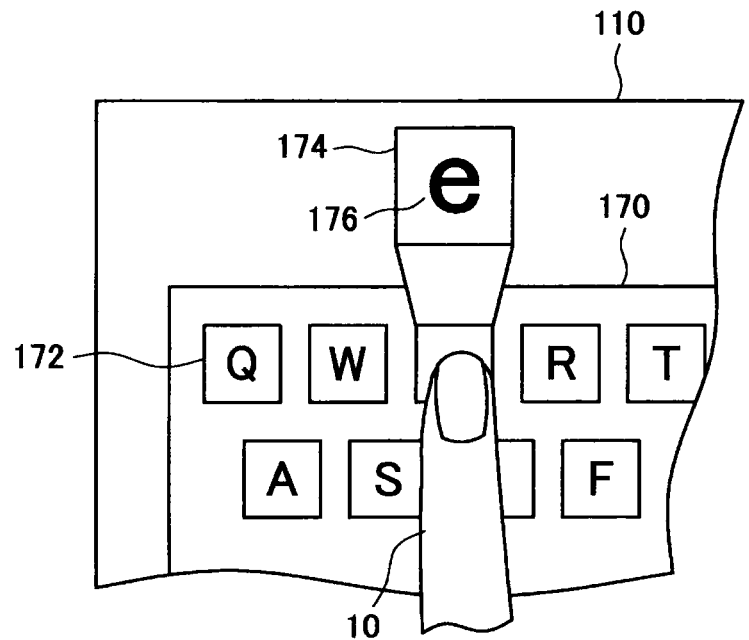
FIG. 9 is an explanatory view which illustrates an image displayed at the display unit and operation of the user.
Figure 9B:
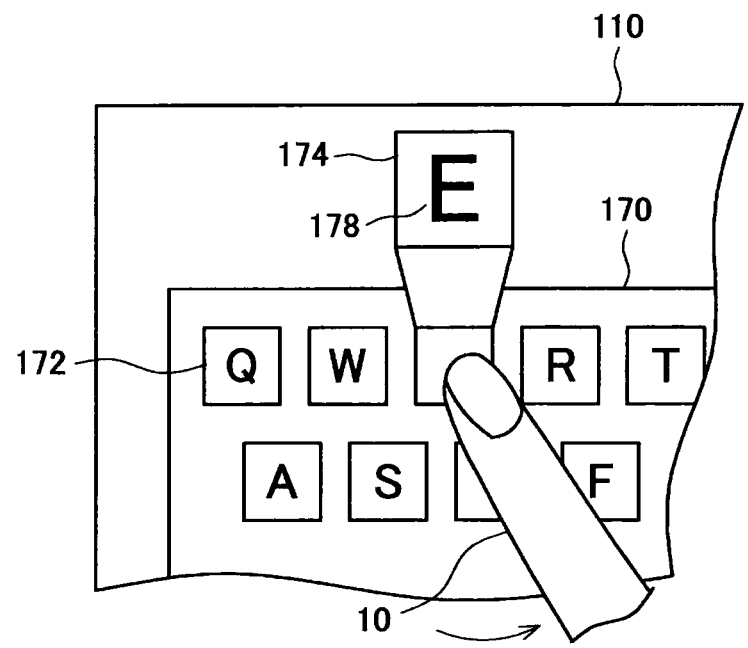

FIG. 9 illustrates an example in which a keyboard 170 is displayed at the display unit 110. For example, a plurality of keys 172 are arranged at the keyboard 170 in QWERTY layout. As illustrated in FIG. 9A, a character which indicates each of the keys 172 is arranged thereon. Then, when the user is about to push the key 172 which is displayed at the screen, the information processing apparatus 100 of the present embodiment detects the first area and the second area of the finger 10 and calculates the respective centroid positions. Therefore, the pointing direction of the finger 10 can be determined.

Then, as the example described with reference to FIG. 7, the information processing apparatus 100 can suppose the position of the finger 10 with the calculation result and move the key 174 to the angle so that the character is not hidden by the finger 10 for the user as illustrated in FIG. 9A. Further, in the present embodiment, the rotation of the finger 10 can be detected as in the case of the dial 140 which is described with reference to FIG. 4 and FIG. 5. Therefore, for example, a function that a lower-case alphabetic character 176 can be keyed before the rotation of the finger 10 is detected and an upper-case alphabetic character 178 can be keyed when the rotation of the finger 10 is detected can be adopted for the application to display the keyboard 170 at the display unit 110.

Figure 10A:
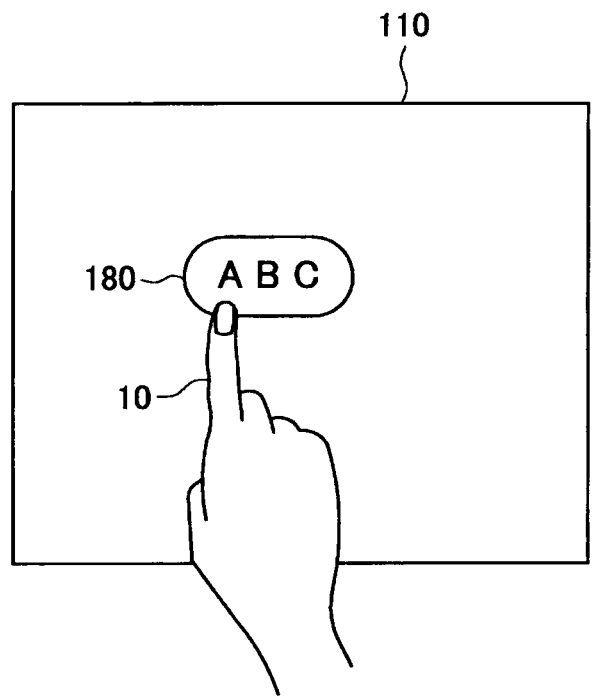
FIG. 10 is an explanatory view which illustrates an image displayed at the display unit and operation of the user.
Figure 10B:
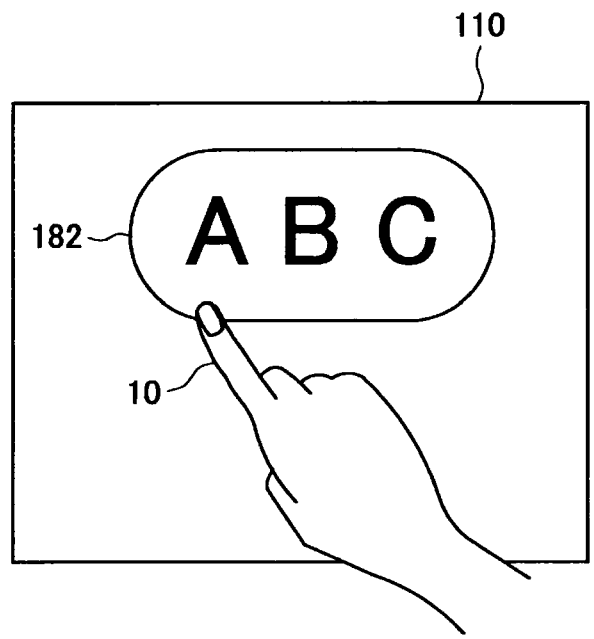

FIG. 10 illustrates an example in which an arbitrary object 180 is displayed at the display unit 110. Since the rotation of the finger 10 can be detected in the present embodiment, the rotation of the finger 10 and the rotation of the object 160 can be related in the application to display the object 160 as illustrated in FIG. 8. However, the present embodiment is not limited to such an example. As illustrated in FIG. 10, the rotation of the finger 10 may be related to zooming of the object 180. It is possible to display the object 180 in normal format before the rotation of the finger 10 is detected as illustrated in FIG. 10A and the object 180 is zoomed-in in accordance with the rotation angle as illustrated in FIG. 10B when the rotation of the finger 10 is detected. On the contrary, the object 180 may be zoomed-out in accordance with the rotation angle.

The present application contains subject matter related to that disclosed in Japanese Priority Patent Application JP 2008-192331 filed in the Japan Patent Office on Jul. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

With the above embodiment, the closeness value acquisition unit is described as an example in which the light reception sensor 110 and the brightness value calculation unit of the control unit 102 are combined. However, the present invention is not limited to such an example. The closeness value acquisition unit may be a touch panel of an electrostatic capacity method and configured with an electrostatic capacity detection unit and a closeness value calculation unit, for example. The electrostatic capacity detection unit detects electrostatic capacity between a finger of the user (the operation entity) and the surface of the display unit. The closeness value calculation unit calculates the variation of the detected electrostatic capacity as the closeness value. For example, it can be calculated whether or not the finger touches the surface of the display unit or how far apart the finger and the surface is in accordance with the variation of the electrostatic capacity. Then, similar to the above embodiment, the area calculation unit of the control unit 102 performs the ternary process to the closeness value and calculates the first area and the second area based on the calculated closeness value.

Further, the closeness value acquisition unit may be a touch panel of a pressure sensitive type and may calculate the closeness value in accordance with the detected pressure. The ternary process is performed to the closeness value in accordance with the degree of the pressure so that the first area and the second area are calculated. For example, the contact direction of the finger can be determined in accordance with the contact pressure by the user's finger against the screen.

Further, in the above embodiment, the respective centroids of the calculated first area and the calculated second area are calculated. However, the present invention is not limited to such an example. Other than the centroid, any value may be adopted as long as the value represents an area with which the direction for connecting two areas can be calculated. It is also possible to adopt the center of a line segment which connects one end and the other end of an area and the like.

What is claimed is:

1. An information processing apparatus, comprising:
a state detection unit configured to detect if an operation entity contacts an operation surface and to detect distance between the operation entity and the operation surface by determining brightness values of incident light received by the operation surface and converting the received light into electric signals;
an area detection unit configured to detect a first area of the operation entity having a first determined brightness value above a first brightness threshold and a second area of the operation entity having a second determined brightness value above a second brightness threshold, wherein the first area is different from the second area and the first brightness threshold is higher than the second brightness threshold in order to determine that the first area is closer to the operation surface than the second area;
a centroid position calculation unit configured to calculate respective centroid positions of the first area and the second area;
a pointing direction determination unit configured to determine a pointing direction of the operation entity when the operation entity is not in contact with the operation surface, wherein the pointing direction is determined based on a line connecting a first centroid of the first area and a second centroid of the second area; and
a control unit configured to select a first option or a second option based on a change of the pointing direction of the operation entity while not in contact with the operation surface,
wherein the first option and the second option are related to a displayed object which is selected by an operation of the operation entity.

2. The information processing apparatus according to claim 1, further comprising a movement detection unit configured to detect movement of the first centroid and the second centroid.

3. The information processing apparatus according to claim 1, wherein the state detection unit includes an electrostatic capacity detection unit configured to detect electrostatic capacity between the operation entity and the operation surface, and a closeness value calculation unit configured to calculate variation of the electrostatic capacity as the closeness value.

4. An information processing method, performed via at least one processor, the method comprising:
detecting if an operation entity contacts an operation surface and detecting distance between the operation entity and the operation surface by determining brightness values of incident light received by the operation surface and converting the received light into electric signals;
detecting a first area of the operation entity having a first determined brightness value above a first brightness threshold and a second area of the operation entity having a second determined brightness value above a second brightness threshold, wherein the first area is different from the second area and the first brightness threshold is higher than the second brightness threshold in order to determine that the first area is closer to the operation surface than the second area;
calculating respective centroid positions of the first area and the second area;
determining a pointing direction of the operation entity when the operation entity is not in contact with the operation surface, wherein the pointing direction is determined based on a line connecting a first centroid of the first area and a second centroid of the second area; and
selecting either a first option or a second option based on a change of the pointing direction of the operation entity while not in contact with the operation surface, wherein the first option and the second option are related to a displayed object which is selected by an operation of the operation entity.

5. The information processing method according to claim 4, further comprising:
detecting movement of the first centroid and the second centroid.

6. The information processing method according to claim 4, further comprising:
detecting electrostatic capacity between the operation entity and the operation surface; and
calculating variation of the electrostatic capacity as the closeness value.

* * * * *